ent">United States Patent [19]

Chavéron et al.

[11] 4,138,501
[45] Feb. 6, 1979

[54] DEMINERALIZATION OF WHEY

[75] Inventors: Michel Chavéron, Vevey; Jaak-Jüri Sihver, Villeneuve; Hubert Duperrex, La Tour-de-Peilz, all of Switzerland

[73] Assignee: Societe d'Assistance Technique Pour Produits Nestle S.A., La Toure-de-Peilz, Switzerland

[21] Appl. No.: 901,524

[22] Filed: May 1, 1978

[30] Foreign Application Priority Data

May 23, 1977 [FR] France ............................... 77 15732

[51] Int. Cl.$^2$ ................................................ A23C 9/14
[52] U.S. Cl. ................................ 426/239; 204/180 P; 210/22 D; 210/27; 210/29; 210/32; 210/34; 210/37 R; 210/38 R; 210/38 A; 426/271; 426/330.2; 426/583; 426/491
[58] Field of Search ...................... 426/239, 271, 330.2, 426/583, 491, 522; 204/180 P, 180 B; 210/22 D, 24, 27, 29, 32, 37 R, 38 R, 38 A, 64, 259, 34

[56] References Cited

U.S. PATENT DOCUMENTS

| 2,778,750 | 1/1957 | Hull | 426/271 X |
|---|---|---|---|
| 2,998,315 | 8/1961 | Peebles et al. | 426/271 X |
| 3,074,797 | 1/1963 | Peebles et al. | 426/271 |
| 3,201,256 | 8/1965 | Clark et al. | 204/180 P |
| 3,320,072 | 5/1967 | Clark et al. | 204/180 P |
| 3,447,930 | 6/1969 | Francis | 426/239 |
| 3,615,664 | 10/1971 | Francis | 426/239 |
| 3,637,480 | 1/1972 | Passino et al. | 204/180 P |
| 3,698,918 | 10/1972 | Goujard | 426/239 |
| 3,852,496 | 12/1974 | Weetall | 426/239 X |
| 3,869,376 | 3/1975 | Tejeda | 204/180 P |

OTHER PUBLICATIONS

Webb et al., *Byproducts from Milk*, 2nd ed., 1970, pp. 102–104 & 315–316.

Primary Examiner—Arthur L. Corbin
Attorney, Agent, or Firm—Watson, Leavenworth, Kelton & Taggart

[57] ABSTRACT

A process for the treatment of milk serum in order to obtain a demineralized milk serum, which comprises subjecting the milk serum, in a clarified and skimmed state, to electrodialysis, and then to ion exchange with the aid of a strong cation exchange resin in the H$^+$ cycle and a weak anion exchange resin in the OH$^-$ cycle.

12 Claims, No Drawings

DEMINERALIZATION OF WHEY

The present invention relates to a process for the treatment of milk serum or whey in order to obtain a demineralised milk serum.

Milk serum or whey is the by-product obtained when milk is transformed into cheese, casein or into casein derivatives. At present, this by-product is valorized various ways but, inspite of its high nutritive value, only small amounts have found an outlet in the human food industry. For example, the use of milk serum in baby foods, particularly in the preparation of humanised milks or special milks, is limited by the fact that this product is proportionally too rich in mineral salts and has to be demineralised, this being an expensive operation with uncertain profitability on an industrial scale.

Numerous methods of demineralisation may be considered, in particular ultra-filtration, reverse osmosis, electrodialysis and ion exchange. The first two methods are too specific and thus only the second two methods have actually been used industrially.

Electrodialysis is an electrochemical method which allows the ionised salts to be removed selectively from a solution by migration under the influence of an electric field through membranes which are selectively permeable to cations and anions. It has turned out to be especially laborious when the solution to be treated has a low saline concentration or when high rates of demineralisation are to be attained.

Ion exchange is a method based on the principle of the ionic balances existing between a solid phase and a liquid phase, and makes use of the phenomena of absorption and exclusion. Large quantities of water are required, an abundance of regeneration agents has to be used and it is difficult to know what to do with these reagents after use. In addition, this method does not necessarily allow the same type of demineralisation as electrodialysis and vice-versa.

According to the invention, a process for the treatment of milk serum is proposed which reduces the disadvantages listed above as far as possible while at the same time affording numerous advantages with regard to the quality of the product obtained, the costs and industrial yields and with regard to the size of the installations for carrying out the process. This process comprises subjecting milk serum in a clarified and skimmed state to electrodialysis then to ion exchange with the aid of a strong cation-exchange resin in the $H^+$ cycle and a weak anion-exchange resin in the $OH^-$ cycle.

Milk serum, whether it is milk serum from cheese-making or milk serum from casein-making usually has the following composition:

|  | sweet milk serum | acidic milk serum |
|---|---|---|
| lactose | 4.0 to 5.0 % | 4.0 to 5.0 % |
| proteins (essentially milk albumen) | 0.6 to 0.8 % | 0.6 to 0.7 % |
| mineral salts (particularly $Na^+$, $K^+$, $Ca^{++}$) | 0.4 to 0.6 % | 0.7 to 0.8 % |
| fats | 0.2 to 0.4 % | 0.05 to 0.1 % |
| total dry extract (content of dry materials) | 5.3 to 6.6 % | 5.3 to 6.0 % |
| acidity in degrees Dornic | 14 to 16 | 43 to 48 |
| pH : | 5.9 to 6.5 | 4.3 to 4.6 |

It can therefore be seen that milk serum is proportionally (particularly in proteins) very rich in mineral salts although the mineral salts are in a very highly diluted state in it. Moreover, a concentrated milk serum, advantageously concentrated thermally under moderate heating conditions to a dry extract of between 18 and 25%, is preferably used as starting material. This milk serum, whether it is from cheese-making or casein-making, whether crude or concentrated, generally contains fine suspended particles and has to be clarified before being subjected to electrodialysis. It has been observed that it was advantageous to remove from it particles having dimensions greater than 100 $\mu$m and to skim it to a residual fat content of below about 0.05%. These operations may be carried out successfully, for example by filtration (sterile) if desired) and centrifugation at high speed, optionally by bactofugation, as is well known in dairy technology. It goes without saying that a milk serum reconstituted from a milk serum powder and, if necessary, clarified and skimmed may also be used.

As indicated above, electrodialysis and ion exchange are methods of demineralisation which are well known per se. Reference is advantageously made to the article by W. Ulrich in Schweizerische Milchwirtschaftliche Forschung 5, 99 (1976), for an introduction to these methods or for separate application of them to the demineralisation of milk sera.

With regard to electrodialysis as the first stage of the process according to the invention, it has been noted that the following operating conditions were the most advantageous:

temperature: from 10° to 50° C., preferably from 10° to 20° C.
voltage: from 0.05 to 0.09 V/cm/g of dry extract
intensity: from 15 to 40 mA/cm$^2$ of membrane which corresponds, for a milk serum having a dry extract of 18 to 25% and a resistivity of between 200 and 90 $\Omega$ cm at a sum voltage of 240 to 450 V at the terminals of an electrodialysis apparatus having, for example, a production capacity of 50,000 liters per day of 90% demineralised serum and comprising 200 cells, that is to say 1.4 to 2.25 V per cell.

Under these conditions, the electrodialysis time is typically from 3 to 6 hours, varying with the transitory degree of demineralisation desired. Thus, from 0.9 to 6 kg of dry extract are treated per m$^2$ of membrane per hour. For an untreated milk serum having about 6% of dry extract, the values are 60 $\Omega$ cm and 260 to 380 V respectively.

For bacteriological reasons, a temperature of 20° C. is not exceeded unless electrodialysis is carried out in the presence of an anti-bacterial agent such as hydrogen peroxide for example. The membranes are preferably made of polystyrene-sulphonated divinyl benzene (cationic membranes) and polystyrene-aminated divinyl benzene (anionic membranes) fixed on inert fibrous polymers, for example Saran and Dynal. These are, in fact, ion exchange resins put into the form of membranes.

After electrodialysis, a partially demineralised milk serum is recovered as an intermediate product having a pH and dry extract comparable to the starting milk serum. The degree of demineralisation may be up to 90% but it is normally preferable to stop at a degree of from 30 to 60%, for example from 40 to 45%. Demineralisation in monovalent ions, $Na^+$ and $K^+$ for example, is proportionally greater than in divalent ions, $CA^{++}$ for example.

Ion exchange which constitutes the second stage of the process according to the invention may be carried out in mixed beds, the product being placed in contact with a mixture of strong cation-exchange and weak anion exchange resins, or in separate beds, the latter variant being the most favourable here. In this case, the intermediate product is passed successively over a strong cation exchange resin in the $H^+$ cycle, then over a weak anion exchange resin in the $OH^-$ cycle. Suitable resins also include sulphonated polymers (cation exchange resins), for example Amberlite IR 120 and IR 200 or aminated polymers (anion exchange resins), for example Amberlite IRA 93 and IRA 68, optionally prepared specially or regenerated to be in the $H^+$ cycle or in the $OH^-$ cycle respectively.

According to a variant of the process, the intermediate product is pasteurised before being passed over the resins.

The product may be placed in contact with the resins either by suspending the resin in the intermediate product to be treated or by percolating the intermediate product through the resin arranged in a column for example, at a temperature of from 4° to 50° C., preferably from 4° to 10° C. A temperature of 10° C. should also not be exceeded for bacteriological reasons, unless ion exchange is to be carried out in the presence of an anti-bacterial agent. The quantity of milk serum subjected to electrodialysis (expressed in the form of dry extract) which may be treated depends upon the degree of demineralisation resulting from electrodialysis, the pH of the milk serum to be treated and the pH of the demineralised milk serum which is to be obtained after ion exchange as well as, obviously, the final degree of demineralisation desired. It has been noted, for example, that the process could be carried out with 0.8 to 1.2 kg of dry extract per total equivalent of ion exchange (gram-valence of exchange per unit weight or volume of resin) for sweet milk serum intended to give a 90% demineralised milk serum having a pH of from 4.5 to 6.5.

The demineralised milk serum obtained in this way is generally slightly more dilute than the starting material. The total degree of demineralisation may reach 90 to 98% without difficulty and both the alkali metal ions and the alkaline-earth metal ions are removed in the same way as the chlorides in particular. The losses of proteins and lactose are small and depend upon the quality of the ion exchange resins selected. It is advantageously standardised (that is to say its composition is readjusted to a standard composition, for example as indicated in French Pat. No. 1,523,106) and pasteurised. If desired, it may be dried, for example, in a tower, after preconcentration if necessary.

This demineralised milk serum is especially suitable for dietetics, particularly in the preparation of humanised milks and dietary milks, and it is produced with the minimum of expense by a process which represents the optimum on an industrial scale. At the slightly higher cost of maintenance of equipment used and of the need to use skilled labour, the said process affords, in relation to the processes of electrodialysis and ion exchange taken individually, decisive advantages such as, for example:

production at a minimum cost price for the same degree of demineralisation,
great flexibility in obtaining milk sera having variable degrees of demineralisation,
the means of working with large volumes in a reduced space.

Of course, for carrying out the process efficiently, the electrodialysis unit should be cleaned between each unit operation, for example by chemical washing (hydrochloric acid then caustic soda or ammonia), by washing with detergent or even by washing with the aid of an enzyme solution, followed by rinsing with tepid or hot water. The ion exchange resins are regenerated periodically by an acid, for example hydrochloric acid, or by a base, for example caustic soda or ammonia, then rinsed. It is possible to make substantial savings by using acidic or basic reagents leaving a previous regeneration treatment for the first part of the regeneration treatment and by reserving the new reagents for the last part of the regeneration treatment.

An apparatus for carrying out the process according to the invention comprises an electrodialysis unit and an ion exchange unit arranged in series. In order to function continuously, this arrangement is advantageously completed, upstream of the electrodialysis unit with a preconcentration unit; a unit for clarification in particular by fine sterile filtration, and a skimming unit; with a pasteurisation unit between the electrodialysis unit and the ion exchange unit; and downstream of the ion exchange unit with another pasteurisation unit, a concentration unit and a drying unit. Buffer tanks are also provided for absorbing surges in production and particularly to permit continuous operation from units such as electrodialysis and ion exchange which operate batchwise. These may be multiple and each be composed of several elements arranged in parallel, for example, depending upon the type of apparatus used, 1 to 3 electrodialysis elements in parallel for two ion exchange elements in columns (2 cationic columns in parallel, then 2 anionic columns in parallel).

EXAMPLES

The following examples, in which the numerical data are expressed on a weight basis, illustrate the operation of the process according to the invention. All these examples have been carried out using the arrangement described below comprising at least the following main elements from upsream to downstream:

one buffer tank for receiving preconcentrated milk serum having a dry extract of about 20%;
one heater-cooler;
one skimmer;
one 100 μm filter,
three IONICS electrodialysis elements comprising 200 cells each and of 50 m² total surface area of membrane per element, arranged in parallel, or 1 SPTI element,
one buffer tank,
one pasteuriser-cooler,
two columns of cation exchanger, arranged in parallel, having an exchange capacity of 1200 equivalents each,
two columns of anion exchanger, arranged in parallel, having an exchange capacity of 1200 equivalents each,
1 buffer tank,
1 pasteuriser,
1 triple or quadruple effect evaporator,
1 drying tower
as well as circulation pumps.

In these examples, as in the remainder of the text including the claims, the "degree of demineralisation"

represents the ratio, expressed as a percentage, of the quantities of mineral salts removed from the milk serum (that is to say the difference between the quantities of mineral salts in the starting milk serum and the residual quantities in the demineralised milk serum) to the quantities of mineral salts from the starting milk serum, brought to the same percentages of dry materials.

EXAMPLE 1

20,000 l of sweet milk serum (pH = 6.1) produced in the manufacture of hard cheeses, previously concentrated under reduced pressure, at 70° to 42° C. in a quadruple effect apparatus to a dry extract of 20% (183 g/l) are fed into the apparatus described above.

This milk serum, having the following composition:

| | |
|---|---|
| density at 20° C. | d = 1.09 |
| total dry extract | 183 g/l |
| ash (mineral salts) | 16 g/l |
| $Na^+$ | 1.12 g/l |
| $K^+$ | 4.49 g/l |
| $Ca^{++}$ | 0.9 g/l |
| $Mg^{++}$ | 0.022 g/l |
| phosphate | 3.5 g/l |
| citrate | 5.2 g/l |
| $Cl^-$ | 3.4 g/l |
| lactic acid | 2.7 g/l |
| pH | 6.1 | is heated to 43° C. then skimmed at 4000 g, cooled to 20° C. and charged into the electrodialysis elements where it resides for about 4 hours under a total voltage varying from 240 to 450 V. An intermediate milk serum is thus obtained (19.4% of dry extract equals 180 g/l) having a degree of demineralisation of 42.9% and which has the following composition:

| | |
|---|---|
| density at 20° C. | d = 1.077 |
| total dry extract | 180 g/l |
| minerals salts | 9.0 g/l |
| $Na^+$ | 0.64 g/l |
| $K^+$ | 2.03 g/l |
| $Ca^{++}$ | 0.4 g/l |
| $Mg^{++}$ | 0.12 g/l |
| phosphate | 2.9 g/l |
| citrate | 5.0 g/l |
| $Cl^-$ | 1.66 g/l |
| lactic acid | 1.8 g/l |
| pH | 6.0 |

After pasteurisation at 72° C. for 15 seconds by steam injection, this partially demineralised milk serum, cooled to 6° C., is fed during 2 hours on to the two rows of ion exchange columns (firstly cationic in $H^+$ cycle, then anionic in $OH^-$ cycle). The speed of passage is 4.1 m/h, that is to say for the cationic column 0.48 cationic equivalent/ion exchange equivalent/h. The milk serum obtained, 93.5% demineralised, has the following composition:

| | % | g/l |
|---|---|---|
| lactose | 12.51 | 118.6 |
| proteins | 2.07 | 19.6 |
| mineral salts | 0.08 | 0.8 |
| of which $Na^+$ | 0.008 | 0.076 |
| $K^+$ | 0.006 | 0.057 |
| $Ca^{++}$ | 0.003 | 0.028 |
| $Cl^-$ | 0.011 | 0.104 |
| phosphate | 0.036 | 0.340 |
| fats | 0.14 | 1.3 |
| total dry extract | 14.8 | 140.3 |
| pH = 4.8 | | |
| density at 20° C | d = 1.05 | |

Under these conditions, 13.4 kg of dry extract of milk serum per $m^2$ of membranes have been treated by electrodialysis and 1.8 kg per equivalent of cation exchange.

3000 l of untreated serum are added to this acidic demineralised serum (as described in French Pat. No. 1,523,106, for example). The mixture is then brought to pH = 6.6 with a 20 to 30% caustic potash solution.

The product thus obtained is pasteurised, preconcentrated to 50% of dry extract (417 g/l), then spray-dried.

The electrodialysis unit is cleaned by rinsing it successively with water, 0.2 M caustic soda, water and 0.2 M hydrochloric acid. The ion exchange resin columns are washed with a large volume of water and then regenerated separately:

Cationic column
  by passage of hydrochloric acid recovered from a previous regeneration cycle for 12 minutes at the rate of 0.05 equivalent/ion exchange equivalent/minute; this first operation is followed by a passage of fresh hydrochloric acid for 20 minutes at a rate of 0.1 equivalent/ion exchange equivalent/minute; the acidic effluent from this last operation is stored in part to be used at the start of the following regeneration cycle; a saving of 20% is thus made over direct use of fresh reagents.

Anionic column
  by passing caustic soda recovered from a previous regeneration cycle for 10 minutes at a rate of 0.04 equivalent/ion exchange equivalent/minute; this first operation is followed as above by a passage of fresh soda for 25 minutes at a rate of 0.07 equivalent/ion exchange equivalent/minute; the basic effluent from this last operation is stored in part to be used at the start of the following regeneration cycle; a saving which is comparable to that indicated above is thus made.

Once regeneration of the two types of columns has been performed, the resins are normally washed with water and then the beds are loosened by backwashing with water.

Comparison Examples (a) A sweet milk serum prepared in the manner described at the beginning of Example 1 is treated by electrodialysis only, continuing electrodialysis to a degree of demineralisation of 90%. It is observed that only 3.6 kg of dry milk serum extract may be treated per $m^2$ of membrane, that is to say about 3.7 times less. The hourly yield is therefore lower by this order of magnitude and, furthermore, the electric power has to be increased greatly to compensate for the reduction in the electrical conductivity as the milk serum is demineralised.

(b) A sweet milk serum is treated only by ion exchange under the conditions described in the middle of Example 1. It is observed that in order to attain a comparable degree of demineralisation, that is to say 90%, only 0.7 kg of dry milk serum extract may be treated per cationic equivalent, that is to say 2.6 times less. It is therefore necessary to use 2.6 times more resin for the same hourly yield, and this necessitates larger installations and particularly the use of 2.6 times more regeneration reagents, the disposal of which is problematical.

From the point of view of cost, a combination of electrodialysis and ion exchangers allows a saving of the order of 20 to 30% in the variable production costs in relation to any of the methods taken separately.

Example 2

The process described in Example 1 is repeated using 20,000 l of a sweet milk serum from pressed cheeses, preconcentrated to 22% of dry extract and having about 17.3 g/l of ash. An intermediate milk serum (21.3% of dry extract) 56.5% demineralised is obtained by electrodialysis carried out for 6 hours. This intermediate serum, cooled to 6° C., is passed over the ion exchange resins, firstly a cation-exchange resin operating in the $H^+$ cycle, then an anion-exchange resin operating in the $OH^-$ cycle. The speed of passage is 4.2 m/h. A milk serum 92.8% demineralised and having the following composition is thus obtained:

|  | % | g/l |
|---|---|---|
| lactose | 14.12 | 132.9 |
| proteins | 1.95 | 18.4 |
| mineral salts | 0.10 | 0.9 |
| of which $Na^+$ | 0.010 | 0.094 |
| $K^+$ | 0.007 | 0.085 |
| $Ca^{++}$ | 0.004 | 0.037 |
| $Cl^-$ | 0.009 | 0.084 |
| fats | 0.13 | 1.2 |
| total dry extract | 16.3 | 153.4 |
| pH = 4.6 | | |
| density at 20° C. | d = 1.062 | |

The pH is then adjusted to 6.8 with the aid of 20% caustic soda. The serum is then concentrated by evaporation to 50% and spray-dried.

Example 3

Acidic milk serum (pH = 4.8, acidity = 42° Dornic) from cottage cheese, preconcentrated to 21% and having about 21.2 g/l of ash is treated as described in Example 1. An acidic intermediate milk serum, 41.3% demineralised (pH = 5.0, acidity = 100° Dornic, dry extract = 19.3%) is obtained by electrodialysis carried out for 4 hours and is transmitted over ion exchange resins in the $H^+$ and $OH^-$ cycles respectively, at a rate of 3.8 $m^3/h$.

A 91.8% demineralised milk serum having the following composition is thus obtained:

|  | % | g/l |
|---|---|---|
| lactose | 13.04 | 123.2 |
| proteins | 1.97 | 18.6 |
| mineral salts | 0.14 | 1.3 |
| of which $Na^+$ | 0.008 | 0.075 |
| $K^+$ | 0.006 | 0.056 |
| $Ca^{++}$ | 0.005 | 0.047 |
| $Cl^-$ | 0.006 | 0.056 |
| fats | 0.05 | 0.5 |
| total dry extract | 15.2 | 143.6 |
| pH = 4.6 | | |
| density at 20° C. | d = 1.058 | |

The columns are regenerated as described in Example 1 but with the following modifications:
  cation column: rate 0.09 equivalent HCl/ion exchange equivalent/minute, for 33 minutes;
  anion column: rate 0.08 equivalent $NH_4OH$/ion exchange equivalent/minute, for 27.5 minutes.

Example 4

The demineralised milk serum powder prepared in accordance with Example 1 is used in the preparation of humanised milk. In order to manufacture 1000 kg of dry powder, 562 kg of demineralised milk serum powder are mixed with a cool standardised milk containing 250 kg of fats (198 kg of lactic fat and 52 kg of corn oil) and having a content of fat-free dry material of 156 kg. This milk, which is standardised in fats, will have been pasteurised at 102° C. beforehand in order to reduce to a maximum extent the action of lipase.

The following ingredients are added to the cool mixture of demineralised milk serum and standardised milk:

glycine = 50 kg
tricalcium citrate = 40 kg
iron = 51 g in the form of a soluble iron salt such as iron saccharate, iron chloride or another iron salt
vitamin A = 15,000,000 I U
vitamin C = 600 g
vitamin $B_1$ = 4 g
vitamin $B_6$ = 12 g
vitamin $B_{12}$ = 20 g
vitamin PP = 80 g
Ca pantothenate = 40 g
folic acid = 300 mg These substances allow a product having a composition similar to that of mother's milk.

The mixture obtained in this way is pasteurised at 110° C. for 10 seconds and concentrated to a dry extract of 45% in a falling film apparatus, this type of apparatus avoiding the degree of denaturation of the serum proteins and the blocking of lysine to the maximum extent.

Concentration is followed immediately by homogenisation at a pressure of 100 kg/$cm^2$ and a temperature of 50° C. The hot homogenised mass is fed directly into a spray-drying tower operating under the following conditions:

hot air temperature: 200 to 250° C.
hot air pressure: 0.13 atmospheres
exit air temperature: 95° C.

The cooled powder which has a specific gravity of 465 g/l is packed in its final packaging. It has the following composition:

| fats | 26.0 % | |
|---|---|---|
| proteins | 12.5 % | |
| of which | 4.5 % | casein |
|  | 6.5 % | serum proteins |
|  | 1.5 % | non-protein nitrogen compounds |
| lactose | 56.2 % | |
| ash | 2.3 % | |
| water | 3 % | |

The ash composition is as follows:

| $Na^+$ | 0.20 % |
|---|---|
| $K^+$ | 0.60 % |
| $Mg^{++}$ | 0.04 % |
| $Ca^{++}$ | 0.39 % |
| $Cl^-$ | 0.30 % |
| phosphate | 0.90% |

For reconstitution, 15 g of product are dissolved in 90 cc of water.

We claim:

1. A process for the treatment of milk serum in order to obtain a demineralised milk serum, which comprises subjecting the milk serum in a clarified and skimmed state, to electrodialysis, and then to ion exchange with the aid of a strong cation exchange resin in the $H^+$ cycle and a weak anion exchange resin in the $OH^-$ cycle.

2. A process as claimed in claim 1, wherein the milk serum is clarified by removing particles having dimensions greater than 100 μm.

3. A process as claimed in claim 1, wherein the milk serum is skimmed to a residual fats content below 0.05%.

4. A process as claimed in claim 1, wherein the milk serum contains from 18 to 25% by weight of dry materials.

5. A process as claimed in claim 1, wherein electrodialysis is carried out at a temperature of from 10° to 20° C.

6. A process as claimed in claim 1, wherein electrodialysis is carried out under a current intensity of from 15 to 40 mA per cm$^2$ of membrane.

7. A process as claimed in claim 1, wherein the intermediate product resulting from electrodialysis has been demineralised to a proportion of from 30 to 60% by weight in relation to the starting milk serum.

8. A process as claimed in claim 1, wherein the intermediate product obtained after electrodialysis is pasteurised before being subjected to ion exchange.

9. A process as claimed in claim 1, wherein ion exchange is carried out at a temperature of from 4 to 10° C.

10. A process as claimed in claim 1, wherein the demineralised milk serum obtained has a proportion of demineralisation of from 90 to 98% by weight in relation to the starting milk serum.

11. A process as claimed in claim 1, wherein the ion exchange resins are regenerated in at least two parts of a regeneration cycle with the aid of a hydrochloric acid reagent for the cation exchange resin and a caustic soda or ammonia reagent for the anion exchange resin.

12. A process as claimed in claim 11, wherein the reagent used for the first part of the regeneration cycle is formed by the reagent used for the last part of the regeneration of a previous regeneration cycle.

* * * * *